United States Patent
Kim et al.

(10) Patent No.: US 9,648,332 B2
(45) Date of Patent: May 9, 2017

(54) ADAPTIVE INTER-COLOR COMPONENT RESIDUAL PREDICTION

(71) Applicant: QUALCOMM Incorporated, San Diego, CA (US)

(72) Inventors: Woo-Shik Kim, San Diego, CA (US); Rajan Laxman Joshi, San Diego, CA (US); Wei Pu, San Diego, CA (US); Joel Sole Rojals, La Jolla, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 14/524,601

(22) Filed: Oct. 27, 2014

(65) Prior Publication Data

US 2015/0117519 A1    Apr. 30, 2015

Related U.S. Application Data

(60) Provisional application No. 61/896,580, filed on Oct. 28, 2013.

(51) Int. Cl.
*H04N 19/186* (2014.01)
*H04N 19/146* (2014.01)
(Continued)

(52) U.S. Cl.
CPC ......... *H04N 19/186* (2014.11); *H04N 19/105* (2014.11); *H04N 19/136* (2014.11); *H04N 19/146* (2014.11); *H04N 19/176* (2014.11)

(58) Field of Classification Search
CPC .. H04N 19/105; H04N 19/136; H04N 19/146; H04N 19/176; H04N 19/186
(Continued)

(56) References Cited

U.S. PATENT DOCUMENTS

2012/0287995 A1* 11/2012 Budagavi ............... H04N 19/11
                                                              375/240.12
2014/0301447 A1* 10/2014 Flynn ..................... H04N 19/30
                                                              375/240.03
(Continued)

FOREIGN PATENT DOCUMENTS

EP    1507415 A2    2/2005
EP    1538844 A2    6/2005

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — William C Vaughn, Jr.
*Assistant Examiner* — Naod Belai
(74) *Attorney, Agent, or Firm* — Shumaker & Sieffert, P.A.

(57) ABSTRACT

A device for decoding video data includes a memory configured to store video data, and at least one processor. The at least one processor is configured to: determine a first bit-depth of luma residual samples for a block of video data, determine a second bit-depth of predicted chroma residual samples for the block of video data, adjust the luma residual samples based on the first bit-depth and the second bit-depth to produce bit-depth adjusted luma residual samples, determine chroma residual samples for the block of video data based on the bit-depth adjusted luma residual samples and the predicted chroma residual samples, and decode the block of video data based on the luma residual samples and the chroma residual samples.

52 Claims, 5 Drawing Sheets

(51) Int. Cl.
*H04N 19/105* (2014.01)
*H04N 19/176* (2014.01)
*H04N 19/136* (2014.01)

(58) Field of Classification Search
USPC .................................................. 375/240.02
See application file for complete search history.

(56) References Cited

U.S. PATENT DOCUMENTS

| | | |
|---|---|---|
| 2014/0348240 A1 | 11/2014 | Kim et al. |
| 2014/0376611 A1 | 12/2014 | Kim et al. |
| 2015/0016512 A1 | 1/2015 | Pu et al. |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Flynn, et al., "High Efficiency Video Coding (HEVC) Range Extensions text specification: Draft 2 (for PDAM)," (Joint Collaborative Team on Video Coding of ISO/IEC JTC1/SC29/WG11 and ITU-T SG.16); Jan. 14-23, 2013, Document: JCTVC-L1005_v4, 313 pp.
Kim, "RCE1: The performance of extended chroma mode for non 4:2:0 format," (Joint Collaborative Team on Video Coding of ISO/IEC JTC1/SC29/WG11 and ITU-T SG.16); Apr. 18-26, 2013, Document: JCTVC-M0097_WD, 10 pp.

Schwarz, et al., "Description of 3D Video Technology Proposal by Fraunhofer HHI (HEVC compatible; configuration A)," ISO/IEC JTC1/SC29/WG11 MPEG2011/M22570, Geneva, Switzerland, Nov. 2011, 48 pp.
Schwarz, et al., "Description of 3D Video Technology Proposal by Fraunhofer HHI (HEVC compatible, configuration B)", MPEG Meeting; Nov. 2011; Geneva; (Motion Picture Expert Group or ISO/IEC JTC1/SC29/WG11), No. m22571, XP030051134; 48 pp.
Fynn, et al., "Range Extensions Draft 4," JCT-VC Meeting; Apr. 18-26, 2013, Vienna, (Joint Collaborative Team on Video Coding of ISO/IEC JTC1/SC29/WG11 and ITU-T SG.16); URL: http://wftp3.itu.int/av-arch/jctvc-site/, No. JCTVC-N1005-v3, XP030114950, 321 pp.
Pu et al., "Non RCE1: Inter Color Component Residual Prediction", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0266-v7, XP030114791, 7 pp.
Dai et al., "RCE1: Adaptive Color Transforms for Range Extensions", JCT-VC Meeting; MPEG Meeting; Apr. 19-28, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0048, XP030114005, 9 pp.
Gershikov et al., "Optimal Color Spaces for Image Demosaicing",Image Processing (ICIP), 2009 16th IEEE International Conference on, IEEE, Piscataway, NJ, USA, Nov. 2009; pp. 1621-1624, XP931628108, ISBN: 978-1-4244-5653-6.
Marpe et al., "Macroblock-Adaptive Residual Color Space Transforms for 4:4:4 Video Coding", Image Processing, 2006 IEEE International Conference on, IEEE, PI, Oct. 1, 2006, pp. 3157-3160, XP031049347, ISBN: 978-1-4244-0480-3.
Topiwala: "Coding of 4:4:4 Video in Professional Extension", JVT Meeting; Sep. 2-5, 2003; San Diego, US; (Joint Videoteam of ISO/IEC JTC1/SC29/WG11 and ITU-T SG.16), No. JVT-I015r7, XP030005752, 16 pp.
Nguyen, et al., "Non-RCE1/Non-RCE2/AHG5/AHG8: AdaptiveInter-Plane Prediction for RGB Content", MPEG Meeting; Apr. 18-26, 2013; Incheon; (Motion Picture Expert Group or ISO/IEC JTC1/SC29/WG11), No. m28687, Document: JCTVC-M0230, XP030057220, 6 pp.
Kawamura, et al., "Chroma intra prediction based on residual luma samples in 4:2:2 chrome format", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J0358, XP030112720, 3 pp.
Kawamura et al., "Chroma intra prediction based on residual luma samples", JCT-VC Meeting; MPEG Meeting; Jul. 14-22, 2011; Torino; (Joint Collaborative Team on Video Coding of ISO/IEC JTC1/SC29/WG11 and ITU-T SG.16); URL:http://wftp3.itu.int/av-arch/jctvc-site/,No. JCTVC-F095, XP030009118, 4 pp.
Kawamura et al., "RCE1: Results of Inter-plane intra coding of residual signals", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0410, XP030114367, 4 pp.
Nguyen, et al., "Non-RCE1/Non-RCE2/AHG5/AHG8: AdaptiveInter-Plane Prediction for RGB Content", MPEG Meeting; Apr. 18-26, 2013; Incheon; (Motion Picture Expert Group or ISO/IEC JTC1/SC29/WG11), No. m28687, XP030057220, 6 pp.
Pu et al., "Non RCE1: Inter Color Component Residual Prediction", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0266-v7, XP030114791, 7 pp.
International Search Report and Written Opinion from International Application No. PCT/US2014/062582, dated Jan. 15, 2015, 11 pp.
Response to Written Opinion dated Jan. 15, 2015, from International Application No. PCT/US2014/062582, filed on Aug. 27, 2015, 5 pp.
Second Written Opinion from International Application No. PCT/US2014/062582, dated Oct. 1, 2015, 5 pp.

(56) References Cited

OTHER PUBLICATIONS

Response to Second Written Opinion dated Oct. 1, 2015, from International Application No. PCT/US2014/062582, filed on Nov. 19, 2015, 30 pp.
Flynn, et al., "High Efficiency Video Coding (HEVC) Range Extensions text specification: Draft 7," (Joint Collaborative Team on Video Coding of ISO/IEC JTC1/SC29/WG11 and ITU-T SG.16); Mar. 27-Apr. 4, 2014, Document: JCTVC-Q1005_v7, 352 pp.
Chen et al., "CE6.a.4: Chroma intra prediction by reconstructed luma samples", 20110310, No. JCTVC-E266, Mar. 10, 2011, XP030008772, 7 pp.
Topiwala, et al., "New Invertible Integer Color Transforms Based on Lifting Steps and Coding of 4:4:4 Video," (Joint Collaborative Team on Video Coding of ISO/IEC JTC1/SC29/WG11 and ITU-T SG.16); 9th Meeting; Sep. 2-5, 2003, Document: JVT-I015d4r1, 15 pp.
Malvar, et al., "YCoCg-R: A Color Space with RGB Reversibly and Low Dynamic Range," (Joint Collaborative Team on Video Coding of ISO/IEC JTC1/SC29/WG11 and ITU-T SG.16); Jul. 22-24, 2003, Document: JVT-I014r3, 8 pp.
Pu, et al., "Non-RCE1: Inter Color Component Residual Prediction," (Joint Collaborative Team on Video Coding of ISO/IEC JTC1/SC29/WG11 and ITU-T SG.16); Document: JCTVC-N0266, Version 1, Jul. 25-Aug. 2, 2013, 4 pp.
International Preliminary Report on Patentability from International Application No. PCT/US2014/062582, dated Feb. 16, 2016, 7 pp.

\* cited by examiner

ADAPTIVE INTER-COLOR COMPONENT RESIDUAL PREDICTION

This application claims priority to U.S. Provisional Patent Application No. 61/896,580, filed Oct. 28, 2013, the entirety of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, such as the scalable video coding (SVC), multiview video coding (MVC), and Range Extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units (CTUs), coding units (CUs) and/or coding nodes. Video blocks may include luma blocks and chroma blocks. In an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients may be entropy coded to achieve even more compression.

SUMMARY

In general, this disclosure describes techniques related to inter-color component residual prediction for color spaces with components having different bit-depths. A bit-depth is a number of bits that is used to represent a particular component of a color space. A video coder (i.e. a video encoder or video decoder) may implement the techniques of this disclosure to predict chroma residual samples of a video block based at least in part on bit-depth adjusted luma residual samples of the video block when a bit-depth of the luma residual samples is different than the bit-depth of the chroma residual samples.

In one example in accordance with the techniques of this disclosure, a method of decoding video data comprises: determining a first bit-depth of luma residual samples for a block of video data, determining a second bit-depth of predicted chroma residual samples for the block of video data, adjusting the luma residual samples based on the first bit-depth and the second bit-depth to produce bit-depth adjusted luma residual samples, determining chroma residual samples for the block of video data based on the bit-depth adjusted luma residual samples and the predicted chroma residual samples, and decoding the block of video data based on the luma residual samples and the chroma residual samples.

In another example in accordance with the techniques of this disclosure, a method for encoding video data comprises: determining a first bit-depth of luma residual samples for a block of video data, determining a second bit-depth of chroma residual samples for the block of video data, adjusting the luma residual samples based on the first bit-depth and the second bit-depth to produce bit-depth adjusted luma residual samples, determining predicted chroma residual samples for the block of video data based on the bit-depth adjusted luma residual samples and the chroma residual samples, and encoding the block of video data based on the luma residual samples and the predicted chroma residual samples.

In another example, the techniques of this disclosure are directed to a video decoder comprising a memory configured to store video data, and at least one processor in communication with the memory and configured to: determine a first bit-depth of luma residual samples for a block of video data, determine a second bit-depth of predicted chroma residual samples for the block of video data, adjust the luma residual samples based on the first bit-depth and the second bit-depth to produce bit-depth adjusted luma residual samples, determine chroma residual samples for the block of video data based on the bit-depth adjusted luma residual samples and the predicted chroma residual samples, and decode the block of video data based on the luma residual samples and the chroma residual samples.

In another example, in accordance with the techniques of this disclosure, a device for encoding video comprises a memory configured to store video data, and at least one processor in communication with the memory and configured to: determine a first bit-depth of luma residual samples for a block of video data, determine a second bit-depth of chroma residual samples for the block of video data, adjust the luma residual samples based on the first bit-depth and the second bit-depth to produce bit-depth adjusted luma residual samples, determine predicted chroma residual samples for the block of video data based on the bit-depth adjusted luma residual samples and the chroma residual samples, and encode the block of video data based on the luma residual samples and the predicted chroma residual samples.

In another example in accordance with the techniques of this disclosure, a device for decoding video comprises: means for determining a first bit-depth of luma residual samples for a block of video data, means for determining a second bit-depth of predicted chroma residual samples for the block of video data, means for adjusting the luma residual samples based on the first bit-depth and the second bit-depth to produce bit-depth adjusted luma residual samples, means for determining chroma residual samples for the block of video data based on the bit-depth adjusted luma residual samples and the predicted chroma residual samples, and means for decoding the block of video data based on the luma residual samples and the chroma residual samples.

In another example in accordance with the techniques of this disclosure, a non-transitory computer-readable storage medium has instructions stored thereon that, when executed, cause at least one processor to: determine a first bit-depth of luma residual samples for a block of video data, determine a second bit-depth of predicted chroma residual samples for the block of video data, adjust the luma residual samples based on the first bit-depth and the second bit-depth to produce bit-depth adjusted luma residual samples, determine chroma residual samples for the block of video data based on the bit-depth adjusted luma residual samples and the predicted chroma residual samples, and decode the block of video data based on the luma residual samples and the chroma residual samples.

The details of one or more examples are set forth in the accompanying drawings and the description below. Other features, objects, and advantages will be apparent from the description and drawings, and from the claims.

DETAILED DESCRIPTION

Figure 1:
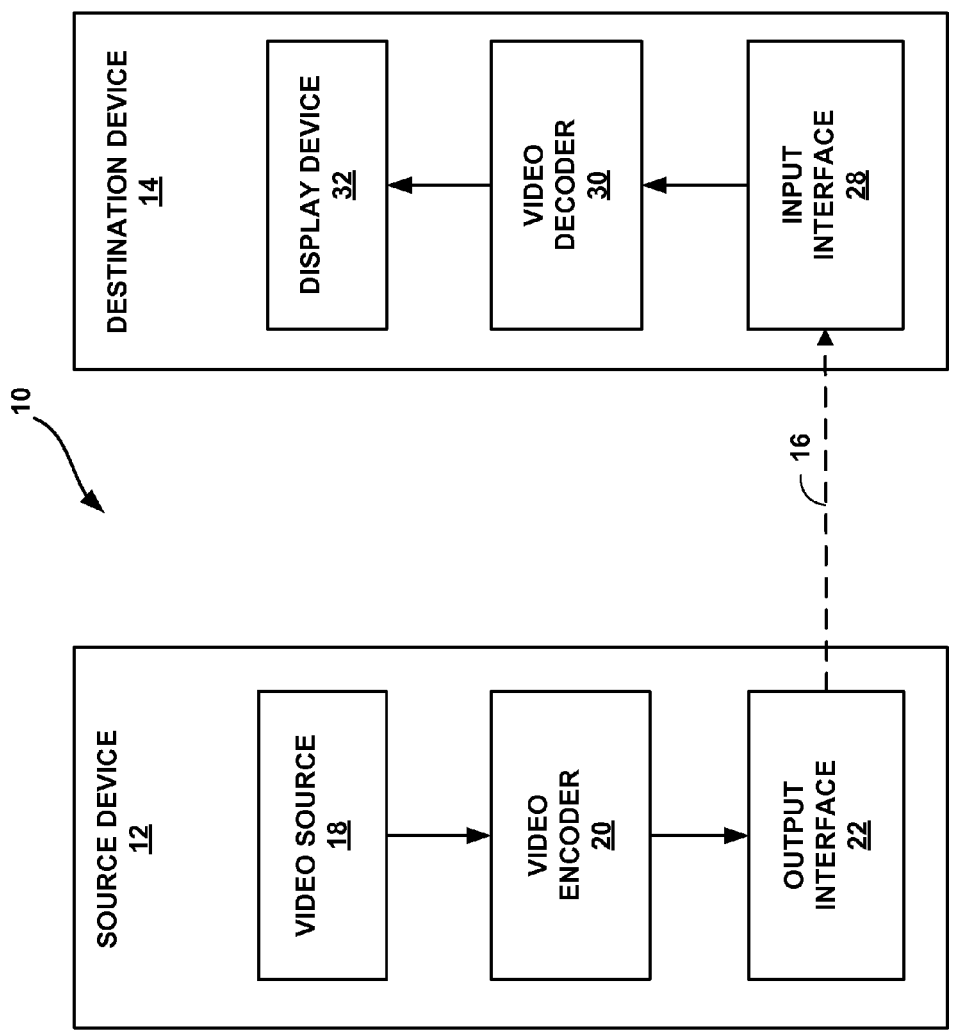
FIG. 1 is a block diagram illustrating an example video encoding and decoding system that may perform techniques for adaptive inter-color component residual prediction in accordance with one or more aspects of this disclosure.

A video coder (i.e. a video encoder or decoder) is generally configured to code a video sequence, which is generally represented as a sequence of pictures. Typically, the video coder uses block-based coding techniques to code each of the sequences of pictures. As part of block-based video coding, the video coder divides each picture of a video sequence into blocks of data. The video coder individually codes (i.e. encodes or decodes) each of the blocks. Encoding a block of video data generally involves encoding an original block of data by generating one or more predictive blocks for the original block, and a residual block that corresponds to differences between the original block and the one or more predictive blocks. Specifically, the original block of video data includes a matrix of pixel values, which are made up of one or more channels of "samples," and the predictive block includes a matrix of predicted pixel values, each of which are also made of predictive samples. Each sample of a residual block indicates a pixel value difference between a sample of a predictive block and a corresponding sample of the original block.

Prediction techniques for a block of video data are generally categorized as intra-prediction and inter-prediction. Intra-prediction (i.e., spatial prediction) generally involves predicting a block from pixel values of neighboring, previously coded blocks within the same picture. Inter-prediction generally involves predicting the block from pixel values of previously coded blocks in previously coded pictures.

The pixels of each block of video data each represent color in a particular format, referred to as a "color representation." Different video coding standards may use different color representations for blocks of video data. As one example, the main profile of the High Efficiency Video Coding (HEVC) video standard, which is under development by the Joint Collaborative Team on Video Coding (JCT-VC), uses the YCbCr color representation to represent the pixels of blocks of video data.

The YCbCr color representation generally refers to a color representation in which each pixel of video data is represented by three components or channels of color information, "Y," "Cb," and "Cr." The Y channel represents luminance (i.e., light intensity or brightness) data for a particular pixel. The Cb and Cr components are the blue-difference and red-difference chrominance, i.e., "chroma," components, respectively. YCbCr is often used to represent color in compressed video data because there is strong decorrelation between each of the Y, Cb, and Cr components, meaning that there is little data that is duplicated or redundant among each of the Y, Cb, and Cr components. Coding video data using the YCbCr color representation therefore offers good compression performance in many cases.

Additionally, many video coding techniques utilize a technique, referred to as "chroma subsampling" to further improve compression of color data. Chroma sub-sampling of video data having a YCbCr color representation reduces the number of chroma values that are signaled in a coded video bitstream by selectively omitting chroma components according to a pattern. In a block of chroma sub-sampled video data, there is generally a luma value for each pixel of the block. However, the Cb and Cr components may only be signaled for some of the pixels of the block, such that the chroma components are sub-sampled relative to the luma component.

A video coder (which may refer to a video encoder or a video decoder) interpolates Cb and Cr components for pixels where the Cb and Cr values are not explicitly signaled for chroma sub-sampled blocks of pixels. Chroma sub-sampling works well to reduce the amount of chrominance data without introducing distortion in blocks of pixels that are more uniform. Chroma sub-sampling works less well to represent video data having widely differing chroma values, and may introduce large amounts of distortion in those cases.

The HEVC Range Extension, which is an extension to the HEVC standard, adds support to HEVC for additional color representations (also referred to as "color formats"), as well as for increased color bit-depth. One recent draft of the HEVC Range Extension is: "HEVC Range Extension text specification: Draft 7," "17$^{th}$ Meeting: Valencia, E S, 27 Mar.-4 Apr., 2014, JCTVC-Q1005_v7, 242 pp.," and is available from http://phenix.int-evry.fr/jct/doc_end_user/documents/17_Valencia/wg11/JCTVC-Q1005-v9.zip. A color bit-depth is the number of bits used to represent each component of a color representation. The support for other color formats may include support for encoding and decoding RGB sources of video data, as well as video data having other color representations and using different chroma sub-sampling patterns than the HEVC main profile. A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, C H, 14-23 Jan., 2013, which is downloadable from: http://phenix.int-evry.fr/jct/doc_end_user/documents/12_Geneva/wg11/JCTVC-L1003-v34.zip.

As mentioned above, the HEVC main profile uses YCbCr because of the generally strong color decorrelation between the luma component, and the two chroma components of the color representation (also referred to as a color format). In some cases however, there may still be a correlations among Y, Cb, and Cr components. The correlations between components of a color representation may be referred to as cross-color component correlation or inter-color component correlation.

A video coder may be configured to predict the value of one component (e.g., a sample of a chroma component) based on the value of a different component (e.g., a samples of a luma component). The process of predicting samples from a first component based on a second component is referred to as "inter-color component prediction." A video coder may predict the value of the first component based on the correlation between the first component and the second component.

For example, in some examples, a video encoder may adjust a block of luma residual samples by increasing or decreasing the luma residual samples to determine a block of bit-depth adjusted luma residual samples. The video encoder may then determine a predictive block of chroma residual samples based on the bit-depth adjusted luma residual samples and the chroma residual samples. The video encoder may then encode a block of video data based on based on the predicted chroma residual samples and luma residual samples.

A video decoder may perform a generally reciprocal process. The video decoder may adjust the luma residual samples, and may determine chroma residual samples based on the bit-depth adjusted luma residual samples and the predicted chroma residual samples. The video decoder may then decode a video block based on the chroma residual samples and the luma residual samples.

A video coder may represent each color component using a specific number of bits. The number of bits that a video coder uses to represent a color channel is referred to as the "bit-depth" of the color channel. In some cases, the luma (Y) channel may have a greater bit-depth (number of bits) than one or both of the chroma channels. In some cases, one or both of the chroma channels may have a greater bit-depth than the luma channel. However, performing inter-color component residual prediction between components having different bit-depths may result in an inaccurate prediction. The techniques of this disclosure are directed toward improving the accuracy of inter-component prediction when the components have differing bit-depths.

The HEVC video coding standard defines a tree-like structure that defines blocks of video data. The techniques of this disclosure may apply to a variety of different components of the HEVC tree-like structure. In HEVC, a video coder partitions a coded picture (also referred to as a "frame") into blocks based on the tree structure. Such blocks may be referred to as treeblocks. In some instances, a treeblock may also be referred to as a largest coding unit (LCU). The treeblocks of HEVC may be roughly analogous to macroblocks of previous video coding standards, such as H.264/AVC. However, unlike the macroblocks of some video coding standards, treeblocks are not limited to a certain size (e.g. a certain number of pixels). Treeblocks may include one or more coding units (CUs), which may be recursively divided into sub-coding units (sub-CUs).

Each CU may include one or more transform units (TUs). Each TU may include residual data that has been transformed. In addition, each CU may include one or more prediction units (PUs). A PU includes information related to the prediction mode of the CU. The techniques of this disclosure may apply to blocks, such as one or more of an LCU, CU, sub-CU, PU, TU, macroblocks, macroblock partitions, sub-macroblocks, or other types of blocks of video data.

During video encoding and decoding a video coder may determine a predictive block of video data using inter- or intra-prediction. Based on the predictive block of video data, a video coder may determine a residual block of video data, which may include differences between the predictive block and the corresponding samples of an original video block, e.g., on the encoder side. On the decoder side, the residual block of video data includes differences between the predictive block and the corresponding samples of the final video block that are output for display. In particular, the residual block of video data may be added to the predictive block to reconstruct the original block of video data.

During video decoding, a video decoder may determine a predictive block that is similar to the current block to be decoded. A PU may include the predictive block, which may further comprise predictive blocks of luma and chroma samples. The video decoder may also receive, in a coded video bitstream, a TU comprising transformed residual blocks of video data, such as transformed luma residual blocks and chroma residual blocks. In particular, a TU may include transform coefficients that represent the residual data. The video decoder may apply an inverse transform to the transform coefficients to reproduce the residual block of data. As discussed above, the residual blocks of video data represent the differences between a block that the decoder outputs for display, and the predictive block. To reconstruct a block for output, a video decoder may combine the inversely-transformed TU samples with the corresponding PU samples.

A video coder may perform the techniques of this disclosure after the video coder finishes parsing and inversely transforming any blocks of transform coefficients to obtain luma residual and chroma residual blocks. In this disclosure, a block of luma residual samples is denoted as:

resY.

The block of luma residual samples may be obtained by a video decoder by inversely transforming a corresponding block of transform coefficients for a luma residual block. The video decoder may use this block of luma residual samples to reconstruct a luma block. For example, the video decoder may combine the pixel difference values provided by luma residual samples with corresponding predictive luma pixel samples to reconstruct a block of luma pixel samples.

A video decoder may likewise obtain a block of chroma residual samples by inverse transforming a corresponding block of transform coefficients for a chroma residual block. A block of chroma residual samples is denoted as:

resC.

The video decoder may use the chroma residual samples to reconstruct a chroma block. For example, the video decoder may combine the pixel difference values provided by chroma residual samples with corresponding predictive chroma pixel samples to reconstruct a block of chroma pixel samples.

This disclosure also introduces the concept of a block of predicted chroma residual samples, denoted as:

resC'.

The predicted chroma residual samples may include residual samples that represent a difference between the chroma residual samples and a version of the luma residual samples, e.g., such as a version that is scaled with a scale factor relative to the luma residual samples, e.g., as described below.

In general, a video encoder configured in accordance with the techniques of this disclosure may determine and encode predicted chroma residual samples. Encoding the predicted chroma residual samples may provide better bitstream coding efficiency compared with encoding chroma residual samples.

To determine the predicted chroma residual samples, the video encoder may scale and/or adjust the block of luma residual samples. To scale the luma samples, the video encoder may determine a scale factor that indicates a correlation between a block of luma residual samples and the block of chroma residual samples in some examples. To adjust the luma residual samples, the video encoder may adjust the luma residual samples based on a bit-depth of the luma residual samples and a bit-depth of the chroma residual samples.

In some examples, the video encoder may first multiply the scale factor by the block of luma residual samples to produce scaled luma residuals. The video encoder may then adjust the scaled luma residual samples based on the bit-depth of the chroma samples and the bit-depth of the luma samples to produce bit-depth adjusted luma residual samples. In some other examples, the video encoder may first adjust the luma residual samples to produce bit-depth adjusted luma residual samples and then scale the bit-depth adjusted luma samples by multiplying the bit-depth adjusted luma residual samples by the scale factor.

In some examples, the video encoder may also determine whether bit-depths of the scaled luma residual samples and the chroma residual samples differ. If there is no difference between the bit-depths, then the video encoder may not adjust the values of the luma residual samples.

If the luma and chroma bit-depths differ, the video encoder may adjust (i.e. increase or decrease) the values of the luma residual samples to produce bit-depth-adjusted luma residual samples. The video encoder may increase or decrease the values of the luma residual samples based on the first bit-depth of the luma residual samples and the second bit-depth of the chroma residual samples. For example, the video encoder may adjust the values of the luma residual samples based on a bit-depth difference between the first bit-depth of the luma residual samples and the second bit-depth of the chroma residual samples. In some examples, to produce bit-depth adjusted luma residual samples, the video encoder may adjust the value of the luma residual samples to match the bit-depth of the chroma residual samples.

Once the video encoder generates bit-depth adjusted luma residual samples, the video encoder may determine the predicted chroma residual samples. The video encoder may calculate the predicted chroma residual samples by determining differences among the chroma residual samples and the corresponding bit-depth-adjusted luma residual samples. The video encoder may then transform, quantize, and encode (e.g., entropy encode) the predicted chroma residual samples and the (non-scaled and non-adjusted) luma residual samples. The video encoder may also quantize and entropy encode the scale factor (if any) applied to the luma residual samples.

A video decoder configured in accordance with the techniques of this disclosure may perform a generally reciprocal process. As an example, a video decoder may receive a block of luma residual samples and a corresponding block of predicted chroma samples. The video decoder may dequantize and inversely transform the block of luma residual samples and the block of predicted chroma residual samples to decode the two received blocks of samples. The video decoder may scale and/or adjust the decoded luma residual samples to determine bit-depth adjusted luma residual samples.

In some examples, the video decoder may scale the luma residual samples based on a scale factor, which the video decoder may receive in an encoded video bitstream. The video decoder may adjust the luma residual samples based on a first bit-depth of the luma residual samples and as second bit-depth of the predicted chroma residual samples to produce bit-depth-adjusted luma residual samples. The bit-depth adjustment may produce bit-depth-adjusted luma residual samples that match the bit-depth of the predicted chroma residual samples.

In some examples, the video decoder may scale the luma residual samples to produced scaled luma residual samples and then adjust the scaled luma residual samples to produce bit-depth adjusted luma residual samples. In some examples, the video decoder may adjust the predictive luma residual samples to produce bit-depth adjusted luma samples. The video decoder may then scale the bit-depth adjusted luma residual samples to produce scaled luma residual samples. If there is no difference between the bit-depths, then the video decoder may not adjust the bit-depth of the luma residual samples.

The video decoder may then determine a block of chroma residual samples for the block of video data based on the bit-depth-adjusted luma residual samples and the predicted chroma residual samples. For example, the video decoder may combine the bit-depth-adjusted luma residual samples with the predicted chroma residual samples to form chroma residual samples. The video decoder then reconstructs the original block by combining corresponding predictive and residual blocks of luma and chroma samples to form a reconstructed block of samples.

The process described above with respect to producing bit-depth-adjusted luma residual samples, and determining chroma residual samples based on the bit-depth adjusted luma residual samples may apply to both chroma components (Cb and Cr). Also, the chroma components (i.e. Cb and Cr) for a block may have different bit-depths in various examples.

FIG. 1 is a block diagram illustrating an example video encoding and decoding system that may perform techniques for inter-component residual prediction in accordance with one or more aspects of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In accordance with the one or more examples of this disclosure, video encoder 20 of source device 12 may be configured to determine a block of luma residual samples for a block of video data, and determine a second bit-depth of chroma residual samples for the block of video data. Video encoder 20 may be further configured to adjust the luma residual samples based on the first bit-depth and the second bit-depth to produce bit-depth adjusted luma residual samples, determine predicted chroma residual samples for the block of video data based on the bit-depth adjusted luma residual samples and the chroma residual samples, and encode the block of video data based on the luma residual samples and the predicted chroma residual samples.

In a reciprocal manner, video decoder 30 may be configured to determine a first bit-depth of luma residual samples for a block of video data, and determine a second bit-depth of predicted chroma residual samples for the block of video data. Video decoder 30 may be further configured to adjust the luma residual samples based on the first bit-depth and the second bit-depth to produce bit-depth adjusted luma residual samples, determine chroma residual samples for the block of video data based on the bit-depth adjusted luma residual samples and the predicted chroma residual samples, and decode the block of video data based on the luma residual samples and the chroma residual samples.

Source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, output interface 22 may output encoded data to a storage device. Similarly, input interface 28 may access encoded data from the storage device. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device (e.g., via streaming or download). The file server may be any type of server capable of storing encoded video data and transmitting that encoded video data to destination device 14. Example file servers include a web server (e.g., for a website), an FTP server, network attached storage (NAS) devices, a Hypertext Transfer Protocol (HTTP) streaming server, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

System 10 of FIG. 1 is merely one example. Techniques for inter-color component residual prediction may be performed by any digital video encoding and/or decoding device. A video encoder/decoder, referred to as a "CODEC" may generally perform one or more of the techniques of this disclosure. Moreover, a video preprocessor may perform the techniques of this disclosure. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. In some examples, video source 18 generates computer graphics-based data as the source video, or a combination of live video, archived video, and computer-generated video. In some cases, video source 18 may be a video camera. In some examples, video source 18 may be a video camera. In some examples, source device 12 and destination device 14 may be so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. Output interface 22 may output he encoded video information onto computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14. e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In the example of FIG. 1, input interface 28 of destination device 14 receives information from computer-readable medium 16. The information of computer-readable medium 16 may include syntax information defined by video encoder 20 that includes syntax elements that describe characteristics and/or processing of blocks and other coded units, e.g., GOPs. Display device 32 displays decoded video data to a user. Display device 32 may comprise any of a variety of display devices such as a cathode ray tube (CRT) display, a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, as well as the HEVC Range Extension, developed by the Joint Collaborative Team on Video Coding (JCT-VC). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques of this disclosure are implemented partially in software, a device may store instructions for the software in a suitable non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks of samples included in a CU, and within individual video slices in order to encode the video data.

The HEVC standard specifies that a video frame or picture may be divided into a sequence of treeblocks (i.e., largest coding units (LCUs) or "coding tree units" (CTUs)). Treeblocks may include luma and/or chroma samples. Syntax data within a bitstream may define a size for the LCUs, which are largest coding units in terms of the number of pixels. In some examples, each of the CTUs comprises a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A video frame or picture may be partitioned into one or more slices. A slice includes a number of consecutive treeblocks in a coding order (e.g., a raster scan order).

Each treeblock may be split into one or more coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, the CU is referred to as a leaf-CU.

Video encoder 20 may recursively perform quad-tree partitioning on the coding tree blocks of a CTU to divide the coding tree blocks into coding blocks, hence the name "coding tree units." A coding block may be an N×N block of samples. In some examples, a CU comprises a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, which may further include one or more prediction units (PUs), or transform units (TUs), in the context of HEVC, or similar data structures in the context of other standards (e.g., macroblocks and sub-blocks thereof in H.264/AVC).

A CU includes one or more prediction units (PUs) and one or more transform units (TUs). A size of the CU corresponds may be square or rectangular in shape. The size of the CU may range from 8×8 pixels up to the size of the treeblock with a maximum of 64×64 pixels or greater. Syntax data associated with a CU may describe, for example, partitioning of the CU into one or more PUs. Partitioning modes may differ between whether the CU is skip or direct mode encoded, intra-prediction mode encoded, or inter-prediction mode encoded. A CU may be partitioned such that PUs of the CU may be non-square in shape. Syntax data associated with a CU may also describe, for example, partitioning of the CU into one or more TUs according to a quadtree.

Video encoder 20 may partition a coding block of a CU into one or more prediction blocks. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that has three separate color planes, a PU may comprise a single prediction block and syntax structures used to predict the prediction block samples.

A transform block may be a rectangular block of samples on which the same transform is applied. A transform unit (TU) of a CU may comprise a transform block of luma samples, two corresponding transform blocks of chroma samples, and syntax structures used to transform the transform block samples. Thus, for a CU that is formatted with a YCbCr color space, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In a monochrome picture or a picture that has three separate color planes, a TU may comprise a single transform block and syntax structures used to transform the transform block samples. A TU can be square or non-square (e.g., rectangular) in shape. In other words, a transform block corresponding to a TU may be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

In general, a PU represents a spatial area corresponding to all or a portion of the corresponding CU, and may include data for retrieving a reference sample for the PU. Moreover, a PU includes data related to prediction. In some examples, a PU may be encoded using intra mode or inter mode. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

As indicated above, a leaf-CU having one or more PUs may also include one or more TUs. The TUs may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as RQTs. That is, a leaf-CU may include a quadtree indicating how the leaf-CU is partitioned into TUs. The root node of a TU quadtree generally corresponds to a leaf-CU, while the root node of a CU quadtree generally corresponds to a treeblock. TUs of the RQT that are not split are referred to as leaf-TUs. In general, this disclosure uses the terms CU and TU to refer to leaf-CU and leaf-TU, respectively, unless noted otherwise.

Both PUs and TUs may contain (i.e., correspond to) one or more blocks of samples corresponding to each of the channels of the color space associated with that block. Blocks of the PUs may include samples of a predictive block, and blocks of the TUs may blocks that include residual samples corresponding to the difference between the original block and the predictive block.

As an example, HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

During motion compensation (described elsewhere in this document), intra- and/or inter-prediction, video encoder 20 and video decoder 30 may be configured to perform inter-color component residual prediction. During inter-component residual prediction, video encoder 20 may determine a predictive residual block that is used to predict the residual samples of a current block. The predictive block may comprise a block of chroma residual samples or a block of luma residual samples. Video encoder 20 may utilize residual samples of a first component to predict the residual samples of a second, different component based on a correlation between samples of the first component (e.g., luma) and the second component (e.g., chroma, Cb or Cr). Video encoder 20 or video decoder 30 may utilize either the original luma residual signal or the reconstructed luma residual signal when determining the samples of the chroma component.

When performing inter-component prediction, video encoder 20 or video decoder 30 may adjust the luma residual samples based on a bit-depth of the luma residual samples and a bit-depth of the chroma residual samples to produce bit-depth adjusted luma residual samples. In some examples, video encoder 20 or video decoder 30 may adjust the luma residual samples to match the bit-depth of the chroma residual samples. Video encoder 20 or video decoder 30 may adjust the luma residual samples using at least one arithmetic shift operation in some examples.

As an example of the adjustment process, if the bit-depth of the scaled luma residual samples is less than the bit-depth of the chroma residual samples, video encoder 20 or video decoder 30 may increase the values of the luma residual samples residual samples. Video encoder 20 or video decoder 30 may increase the bit-depth of the luma residual samples to produce bit-depth-adjusted luma residual samples. If the bit-depth of the scaled luma residual samples is greater than the bit-depth of the chroma residual samples, video encoder 20 or video decoder 30 may decrease the values of the luma residual samples. If the bit-depths of the chroma residual samples and luma residual samples are equal, video encoder 20 may not increase or decrease the values of the luma residual samples.

Video encoder 20 or video decoder 30 may also scale the luma residual samples before or after adjusting the luma residual samples. To scale the luma residual samples, video encoder 20 may determine a scale factor (α), based on a correlation between luma residual samples for a block of video data and chroma residual samples for the block of video data. In some examples, video encoder 20 may encode the scale factor, and video decoder 30 may receive the scale factor in an encoded video bitstream. Video encoder 20 or video decoder 30 multiply the luma residual samples or the bit-depth adjusted luma residual samples by the scale factor to produce scaled luma residual samples. Once video encoder 20 or video decoder 30 have scaled and/or bit-depth adjusted the luma residual samples, video encoder 20 or video decoder 30 may determine chroma residual samples based on the bit-depth adjusted and/or scaled luma residual samples.

In some cases, video encoder 20 or video decoder 30 may saturate a value of the bit-depth adjusted and/or scaled luma residual samples when scaling and/or adjusting the bit-depth of the luma residual samples. To avoid saturating the luma residual values, video encoder 20 may clip the value of the bit-depth adjusted and/or scaled luma residual samples within a range. The maximum and minimum values of the range may be based on a variable in some examples. As an example, video encoder 20 or video decoder 30 may clip the value of the bit-depth adjusted and/or scaled luma residual samples according to the following equation:

$$[-\text{max}ResY',(\text{max}ResY-1)],$$

where maxResY' is a variable that indicates the positive and negative range bounds of the desired range of the bit-depth adjusted and/or scaled luma residual samples.

In some cases the number of bits used to represent each of the luma residual samples and a channel of the chroma residual samples, referred to as the bit-depth, may not be equal. In accordance with the techniques of this disclosure, in these cases, video encoder 20 or video decoder 30 may adjust (i.e. increase or decrease) the values of the luma residual samples to produce bit-depth adjusted luma residual samples. Video encoder 20 and video decoder 30 may adjust the values of the luma residual samples based on the bit-depth of the luma residual samples and the chroma residual samples. For example, video encoder 20 or video decoder 30 may adjust the bit-depth of the luma residual samples to match the bit-depth of the chroma residual samples in some examples. After adjusting the luma residual samples to produce bit-depth adjusted luma residual samples, video encoder 20 and video decoder 30 may scale the bit-depth adjusted luma residual samples based on a scale factor in some examples.

In some examples, video encoder 20 and video decoder 30 may calculate a difference between the chroma residual bit-depth and the scaled luma residual bit-depth according to equation (1):

$$\text{delta\_bit\_depth} = \text{bitDepth\_luma} - \text{bitDepth\_chroma} \quad (1).$$

In equation (1), delta_bit_depth is the difference, in bits, between the bit-depth of the scaled luma residual samples (bitDepth_luma), and the bit-depth of the chroma residual samples (bitDepth_chroma).

In an example when delta_bit_depth>0 (i.e. when the luma bit-depth is greater than the chroma bit-depth), video encoder 20 or video decoder 30 may adjust the bit-depth of the luma residual samples to produce bit-depth adjusted luma residual samples by reducing the bit-depth of the luma residual samples according to equation (2):

$$resY' = \text{sign}(resY)*((|resY|+\text{offset})>>\text{delta\_bit\_depth}) \quad (2).$$

In equation (2), resY is a block of luma residual samples, resY' is a block of bit-depth adjusted luma residual samples, and ">>" represents an arithmetic right-shift operation. The variable resY may represent an original luma residual signal or a reconstructed luma residual signal. Sign(x) is a function that is equal to 1 if x is a positive value, and is equal to −1 if x is a negative value. The variable "offset" is an offset variable that video encoder 20 may use to facilitate rounding. In some examples, video encoder 20 and video decoder 30 may set offset equal to $2^{(\text{delta\_bit\_depth}-1)}$, subject to the constraint that offset is >=0. The operation: $2^{(\text{delta\_bit\_depth}-1)}$ of equation (2) may represent a rounding operation. In one example, video encoder 20 or video decoder 30 may set offset equal to 0.

In a case when delta_bit_depth<0, video encoder 20 and video decoder 30 may decrease the values of the scaled residual samples based on delta_bit_depth to generate resY'. In one example, video encoder 20 or video decoder 30 may calculate resY', a block of bit-depth adjusted luma residual samples, according to equation (3):

$$resY'=resY<<\text{delta\_bit\_depth} \qquad (3),$$

where "<<" represents an arithmetic left-shift operation.

It may be possible to saturate the values of resY'. In one example, the values of resY' are clipped to the range [−maxResY', (maxResY'−1)], where maxResY' indicates the desired range of resY'.

After video encoder 20 or video decoder 30 determines the bit-depth adjusted luma residual samples, video encoder 20 and video decoder 30 may scale the bit-depth adjusted luma residual samples to produce scaled luma residual samples. In some examples, video encoder 20 and video decoder 30 may adjust the luma residual samples according to equation (4) below:

$$resY''=\alpha*resY' \qquad (4).$$

In equation (4), resY'' represents the scaled luma residual samples, α is the scale factor, and resY' represents the bit-depth adjusted luma residual samples.

In the above examples, video encoder 20 and video decoder 30 may adjust the luma residual samples based on the bit-depth of the luma residual samples and the bit-depth of the chroma residual samples, and then scale the bit-depth adjusted luma residual samples, e.g. according to equations (3) and (4). In some additional examples, video encoder 20 and video decoder 30 may first scale the bit-depth according to equation (5):

$$resY'=\alpha*resY \qquad (5),$$

where resY represents the luma residual samples, α is the scale factor, and resY' represents the scaled luma residual samples. Following scaling the luma residual samples to produce scaled luma residual samples, video encoder 20 and video decoder 30 may then adjust the luma residual samples to produce bit-depth adjusted luma residual samples, referred to as resY'' in these examples. In some examples, video encoder 20 and video decoder 30 may adjust the scaled luma residual samples by arithmetically shifting the scaled luma residual samples at least once based on the bit-depth of the luma residual samples and the bit-depth of the chroma residual samples.

After video encoder 20 determines resY'', video encoder 20 may subtract resY'' (which may represent scaled and/or bit-depth adjusted luma residual samples) from the corresponding block of chroma residual samples, referred to as resC, to generate a predicted block of chroma residual samples, resC'. Equation (6) further describes the process of determining resC':

$$resC'=resC-resY'' \qquad (6).$$

Video encoder 20 may transform, quantize and entropy encode the (non-scaled and non-adjusted) block of luma residual samples. Video encoder 20 may also transform, quantize and entropy encode the block of predicted chroma residual samples.

In a generally reciprocal manner in accordance with the techniques of this disclosure, video decoder 30 may receive and decode luma residual samples and predicted chroma residual samples for a block of video data. In some examples, video decoder 30 may receive and decode a scale factor. Each of the received values may be inverse quantized and inverse transformed. Video decoder 30 may dequantize and inversely transform the scaling factor, the luma residual samples, and/or the predicted chroma residual samples.

In some examples, video decoder 30 may adjust the luma residual samples using at least one arithmetic shift operation to produce bit-depth adjusted luma residual samples. Video decoder 30 may then scale the bit-depth adjusted luma residual samples, e.g. according to equation (4) above. In some other examples, video decoder 30 may first multiply the scale factor by the block of luma residual samples to produce a block of scaled luma residual samples, resY', as described in equation (5), above, and then adjust the luma residual samples using at least one arithmetic shift operation to produce bit-depth adjusted luma residual samples.

Video encoder 30 may combine the block of scaled and/or bit-depth adjusted luma residual samples with the block of predicted chroma residual samples to produce a final or updated block of chroma residual samples. Equation (7) describes the process by which video decoder 30 may determine a block of chroma residual samples based on a block of scaled and/or bit-depth adjusted luma residual samples and a block of predicted chroma residual samples:

$$resC'''=resC''+resY'' \qquad (7).$$

In equation 7, resC''' represents the block of chroma residual samples. The variable resC'' represents the inversely quantized and inversely-transformed block of predicted chroma residual samples, and resY'' is the scaled and/or bit-depth-adjusted block of luma residual samples.

In some examples, rather than adjusting (i.e., right- or left-shifting) a block of scaled luma residual samples, video encoder 20 or decoder 30 may adjust the scale factor. For example, the scale factor may have one of the following possible values: {−1, −0.5, −0.25, −0.125, 0, 0.125, 0.25, 0.5, or 1}. Video encoder 20 or video decoder 30 may scale (i.e. increase or decrease) the value of the scale factor based on the value of the delta_bit_depth variable as defined above with respect to equation (1).

In some examples, video encoder 20 or video decoder 30 may calculate an adjusted value of α, referred to as α'. If delta_bit_depth is greater than 0, video encoder 20 or video decoder 30 may calculate α' according to equation (8):

$$\alpha'=\text{sign}(\alpha)*(|\alpha|>>\text{delta\_bit\_depth}) \qquad (8).$$

If delta_bit_depth is less than 0, video encoder 20 or video decoder 30 may calculate α' according to equation (9):

$$\alpha'=\alpha<<\text{delta\_bit\_depth} \qquad (9).$$

Video decoder 30 and video encoder 20 may then calculate scaled and/or bit-depth adjusted luma residual samples as described above, however, video encoder 20 and video decoder 30 may use the adjusted scale factor, α' instead of α to scale the luma residual samples.

In some examples, video encoder 20 or video decoder 30 may adjust and scale luma residual samples by using at least one arithmetic shift operation. In one example, video encoder 20 or video decoder 30 may calculate resY' according to equation (10) if (α*resY)>0:

$$resY'=(*resY)>>3 \qquad (10).$$

In another example, video encoder 20 and video decoder 30 may calculate the bit-depth adjusted and/or scaled luma residual samples according to equation (11) if (α*resY)<0:

$$resY'=-(|\alpha*resY|>>3) \qquad (11).$$

In various examples 10 and 11, α may have the values of {−8, −4, −2, −1, 0, 1, 2, 4, 8} in some examples.

In some examples, video encoder 20 or video decoder 30 may adjust the luma residual samples to produce bit-depth adjusted luma residual samples (e.g., resY') based on a shifting variable, referred to as N. The shifting variable, N, may depend on the bit-depth difference. Video encoder 20 or video decoder 30 may calculate N according to equation (12):

$$N=(\text{delta\_bit\_depth}+3) \qquad (12).$$

If N is equal to 0, then video encoder 20 or video decoder 30 may calculate the bit-depth adjusted and/or scaled luma residual samples without adjusting the luma residual samples or scaled luma residual samples. If N is greater than 0, video encoder 20 or video decoder 30 may calculate resY' according to equation (13):

$$resY'=\text{sign}(\alpha^*resY)^*((|\alpha^*resY|+\text{offset})>>N) \qquad (13),$$

where sign(x) is equal to 1 if x is a positive value, equal to −1 if x is a negative value, and where offset is equal to $2^{(N-1)}$, as described above with respect to equation (2). Offset may be equal to 0 in some examples.

If N<0, video encoder 20 and video decoder 30 may calculate the bit-depth adjusted and/or scaled luma residual samples according to equation (14):

$$resY'=resY<<N \qquad (14).$$

It may be possible to saturate the values of the bit-depth adjusted and/or scaled luma residual samples. In one example, the video encoder 20 or video decoder 30 may clip the values of the bit-depth adjusted and/or scaled luma residual samples to the range [−maxResY', (maxResY'−1)], where maxResY' indicates the desired range of resY', resY can be the original luma residual signal or the reconstructed luma residual signal. Then, video encoder 20 or video decoder 30 may determine the predicted chroma residual samples based on the block of luma residual samples according to equation (15):

$$resC'=resC-resY' \qquad (15).$$

Video encoder 20 may transform, quantize, and entropy encode resC'.

At the decoder side, video decoder 30 may perform the same operations as performed to generate the bit-depth adjusted and/or scaled luma residual samples, but only using the reconstructed luma residual signal. Video decoder 30 may generate reconstructed chroma signal according to equation (16):

$$resC'''=resC''+resY' \qquad (16),$$

where resC" is the inverse quantized and inverse transformed signal of chroma.

In some examples, video encoder 20 may be configured to signal a value that indicates a difference in the bit-depth of the luma residual samples and the chroma residual samples. In a reciprocal manner, video decoder 30 may be configured to decode a value that indicates the difference in the bit-depth of the luma residual samples and the chroma residual samples. Video encoder 20 and video decoder 30 may code the value indicative of the bit-depth difference even if the value is equal to zero in some examples. In some examples, video encoder 20 and video decoder 30 may code the value indicative of the bit-depth difference only if the value is not equal to zero.

In some examples, video encoder 20 and video decoder 30 may not use a shifting operation to increase or decrease the values of the luma residual samples to produce scaled and/or bit-depth adjusted luma residual samples. In some examples, video encoder 20 and video decoder 30 may use a scale factor and multiply the scale factor rather than using a shifting operation to adjust the luma residual samples.

In some examples, video encoder 20 and video decoder 30 may use a pre-defined map to adjust the luma residual samples by mapping the value of the original or reconstructed luma residual values to the scaled and/or bit-depth adjusted luma residual values. Video encoder 20 may signal the map, which video decoder 30 may decode, or the map may be pre-defined. The map may have one or more entries.

Following intra-predictive or inter-predictive coding using the PUs of a CU, video encoder 20 or video decoder 30 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 or video decoder 30 may form the TUs including the residual data for the CU, and then transform the TUs to produce transform coefficients for the CU. In other words, video encoder 20 may apply a transform to a transform block for a TU to generate a transform coefficient block for the TU. Video decoder 30 may apply an inverse transform to the transform coefficient block for the TU to reconstruct the transform block for the TU.

Following application of transforms (if any) to produce transform coefficients, video encoder 20 or video decoder 30 may perform quantization of the transform coefficients. In other words, video encoder 20 may quantize the transform coefficients of a transform coefficient block. Video decoder 30 may dequantize the transform coefficients of the transform coefficient block. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. Inverse quantization (i.e., dequantization) may increase the bit depths of some or all of the coefficients.

Following quantization, video encoder 20 may scan the transform coefficients, producing a one-dimensional vector from a two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 or video decoder 30 may utilize a predefined scan order to scan the quantized transform coefficients to produce a serialized vector that can be entropy encoded. In other examples, video encoder 20 or video decoder 30 may perform an adaptive scan. After scanning the quantized transform coefficients to form a one-dimensional vector, video encoder 20 or video decoder 30 may entropy encode the one-dimensional vector, e.g., according to context-adaptive binary arithmetic coding (CABAC), context-adaptive variable length coding (CAVLC), syntax-based context-adaptive binary arithmetic coding (SBAC), Probability Interval Partitioning Entropy (PIPE)

coding or another entropy coding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in variable length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
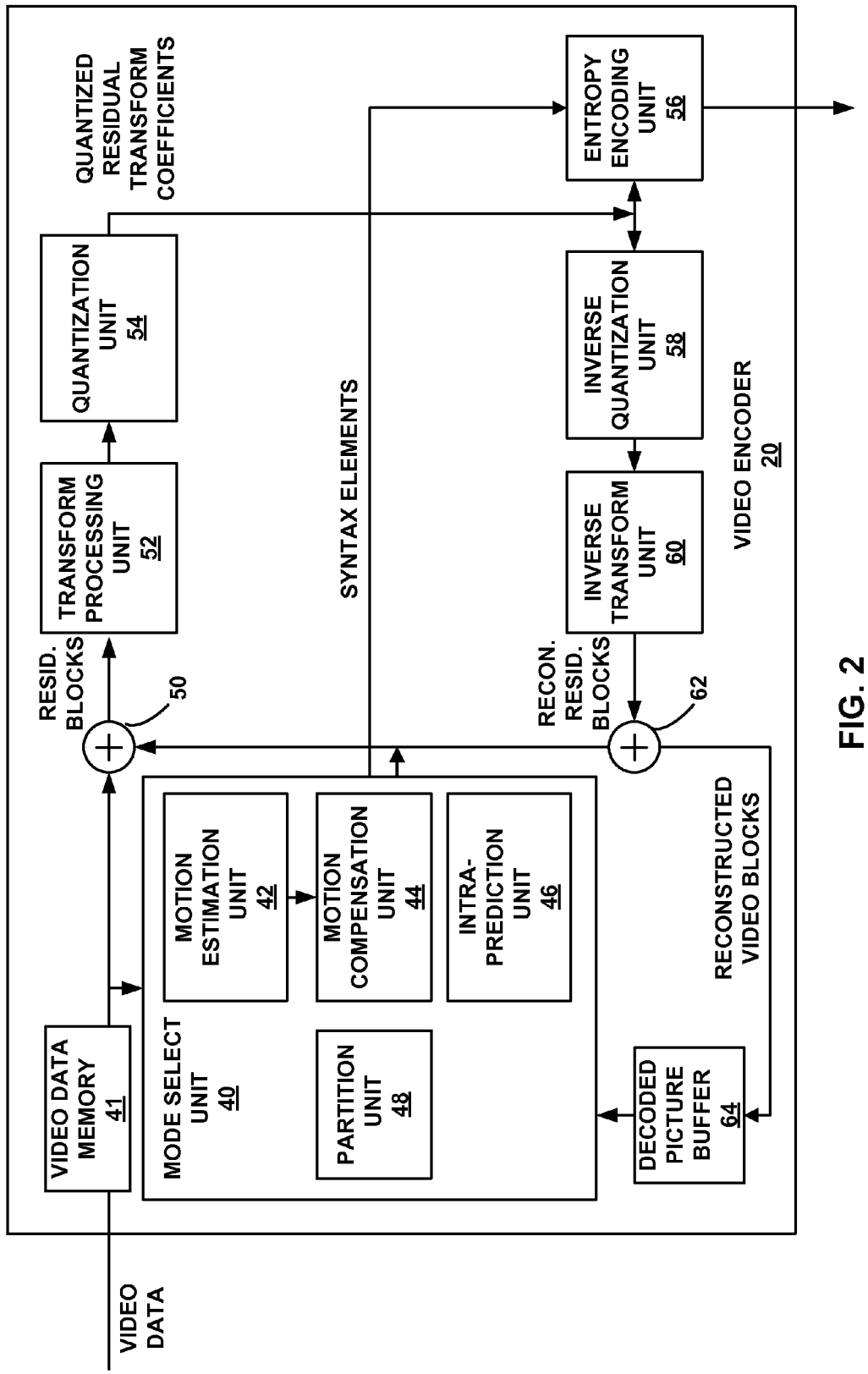
FIG. 2 is a block diagram illustrating an example of a video encoder that may perform techniques for adaptive inter-color component residual prediction in accordance with one or more aspects of this disclosure.

FIG. 2 is a block diagram illustrating an example of a video encoder that may perform techniques for adaptive inter-color component residual prediction in accordance with one or more aspects of this disclosure. In the example of FIG. 2, video encoder 20 includes video data memory 41, mode select unit 40, decoded picture buffer 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter). In some examples, a deblocking filter may be used to generate a filtered block of luma samples for inter-color component prediction, as described above.

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. In this way, video encoder 20 may receive a current video block within a video frame to be encoded.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Summer 50 may form a residual video block by determining differences between pixel values of the predictive block from the pixel values of the current video block being coded. In some examples, summer 50 may determine not determine or encode a residual block.

Partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and may provide the resulting intra- or inter-coded block to summer 50. Summer 50 may generate residual block data. For instance, summer 50 may generate residual block data for a current CU such that each sample of the residual block data is equal to a difference between a sample in a coding block of the current CU and a corresponding sample of a prediction block of a PU of the current CU. Summer 62 may reconstruct the encoded block (i.e., the coding block) for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). In other words, a motion vector may indicate a displacement between a prediction block of a PU and a corresponding predictive block in a reference picture. A predictive block is a block that is found to closely match the block to be coded (i.e., the prediction block), in terms of pixel difference, which may be determined by sum of absolute difference (SAD), sum of square difference (SSD), or other difference metrics.

In some examples, video encoder 20 may calculate values for sub-integer pixel positions of reference pictures stored in decoded picture buffer 64. In other words, video encoder 20 may use apply one or more interpolation filters to samples of one or more reference pictures to generate samples in a predictive block of a PU. In some examples, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 may calculate a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. If motion estimation unit 42 has calculated a motion vector, motion estimation unit 42 may send the calculated motion vector to entropy encoding unit 56 and motion compensation unit 44.

Motion compensation unit 44 may perform motion compensation. Motion compensation may involve fetching or generating one or more predictive blocks for a PU based on the one or more motion vectors determined for the PU by motion estimation unit 42. Again, motion estimation unit 42 and motion compensation unit 44 may be functionally integrated in some examples. Upon receiving a motion vector for a PU of a current video block, motion compensation unit 44 may locate a predictive block from a picture of one of the reference picture lists based on the motion vector. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and may select the intra-prediction mode having the best rate-distortion characteristics among the tested intra-prediction modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as code-word mapping tables), definitions of encoding contexts for various blocks, and indications of a most probable intra-prediction mode, an intra-prediction mode index table, and a modified intra-prediction mode index table to use for each of the contexts.

In some examples, intra-prediction unit 46 and/or motion compensation unit 44 may be configured to determine a difference in a bit-depth of the luma residual samples and the chroma residual samples according to equation (2). Based on the bit-depth of the chroma residual samples and the bit-depth of the luma residual samples, intra-prediction unit 46 and/or motion compensation unit 44 may adjust the luma residual samples to produce bit-depth adjusted luma residual samples. Intra-prediction unit 46 and/or motion compensation unit 44 may adjust the luma residual samples or scaled luma residual samples according to equations (2)-(3), and (10)-(14) in various examples.

Intra-prediction unit 46 and/or motion compensation unit 44 may determine a scale factor that indicates a relation between luma residual samples for a block of video data, and chroma residual samples for the block of video data in some examples. Intra-prediction unit 46 and/or motion compensation unit 44 may calculate scaled luma residual samples based on the scale factor. Intra-prediction unit 46 and/or motion compensation unit 44 may determine a block of predicted chroma residual samples based on the luma residual block, the scale factor, and the chroma residual samples.

In various alternative examples, intra-prediction unit 46 and/or motion compensation unit 44 may adjust the scale factor based on the calculated bit-depth difference as described in equations (8)-(9). Intra-prediction unit 46 and/or motion compensation unit 44 may also calculate the luma residual samples based on a shifting variable, N, as described in equations (12)-(14).

In some examples, intra-prediction unit 46 and/or motion compensation unit 44 may be configured to adjust the luma residual samples using a lookup table (LUT). The output of the LUT may be the bit-depth adjusted luma residual samples. In various examples, the LUT may be predefined, or intra-prediction unit 46 and/or motion compensation unit 44 may adaptively determine the LUT.

Video encoder 20 may form a residual video block by determining differences between prediction data (e.g., a predictive block) from mode select unit 40 and data from an original video block (e.g., a coding block) being coded. Summer 50 represents the component or components that perform this difference operation. Transform processing unit 52 may apply a transform to the residual block, producing a video block (i.e., a transform coefficient block) comprising residual transform coefficient values. For example, transform processing unit 52 may apply a discrete cosine transform (DCT) or a conceptually similar transform to produce the residual coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Video encoder 20 may encode various parameter sets in a coded video bitstream. Such parameter sets may include a picture parameter set (PPS), which may include syntax elements that are common to one or more pictures, a sequence parameter set, which may include syntax elements that are common to one or more sequences of pictures.

Following quantization, entropy encoding unit 56 entropy codes the quantized transform coefficients. In other words, entropy encoding unit 56 may entropy encode syntax elements representing the quantized transform coefficients. For example, entropy encoding unit 56 may perform context adaptive binary arithmetic coding (CABAC), context adaptive variable length coding (CAVLC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, video decoder 30 may transmit the encoded bitstream to another device (e.g., video decoder 30) or archived for later transmission or retrieval.

In addition to entropy coding quantized transform coefficients, entropy encoding unit 56 may be configured to entropy encode a scale factor. In various examples, entropy encoding unit 56 may be configured to signal the scale factor (alpha) value as a fixed-length code in bypass mode of a CABAC coder.

In some examples, entropy encoding unit 56 may be configured to signal a LUT that maps at least one scale factor to at least one adjusted scale factor. In some examples, entropy encoding unit 56 may entropy encode a value that indicates a bit-depth difference between the chroma residual samples and the luma residual samples.

Inverse quantization unit 58 and inverse transform unit 60 apply inverse quantization and inverse transformation, respectively, to reconstruct the residual block in the pixel domain, e.g., for later use as a reference block. For instance, inverse quantization unit 58 may dequantize a transform coefficient block. Inverse transform unit 60 may reconstruct a transform block for a TU by applying an inverse transform to the dequantized transform coefficient block. Summer 62 adds the reconstructed residual block to the motion compensated prediction block produced by motion compensation unit 44 to produce a reconstructed video block for storage in decoded picture buffer 64. Motion estimation unit 42 and motion compensation unit 44 may use the reconstructed video block as a reference block to inter-code (i.e., inter predict) a block in a subsequent video frame. Motion compensation unit 44 may also apply one or more interpolation filters to the reconstructed residual block to calculate sub-integer pixel values for use in motion estimation.

Motion estimation unit 42 may determine one or more reference pictures, that video encoder 20 may use to predict the pixel values of one or more For PUs that are inter-predicted. Motion estimation unit 42 may signal each reference picture as an LTRP or a short-term reference picture. Motion estimation unit 42 may store the reference pictures in a decoded picture buffer 64 until the pictures are marked as unused for reference. Mode select unit 40 of video encoder 20 may encode various syntax elements that include identifying information for one or more reference pictures.

In this manner, video encoder 20 in FIG. 2 represents an example of a video encoder configured to determine a block of luma residual samples for a block of video data, and determine a second bit-depth of chroma residual samples for the block of video data. Video encoder 20 may be further configured to adjust the luma residual samples based on the first bit-depth and the second bit-depth to produce bit-depth adjusted luma residual samples, determine predicted chroma residual samples for the block of video data based on the bit-depth adjusted luma residual samples and the chroma residual samples, and encode the block of video data based on the luma residual samples and the predicted chroma residual samples.

Figure 3:
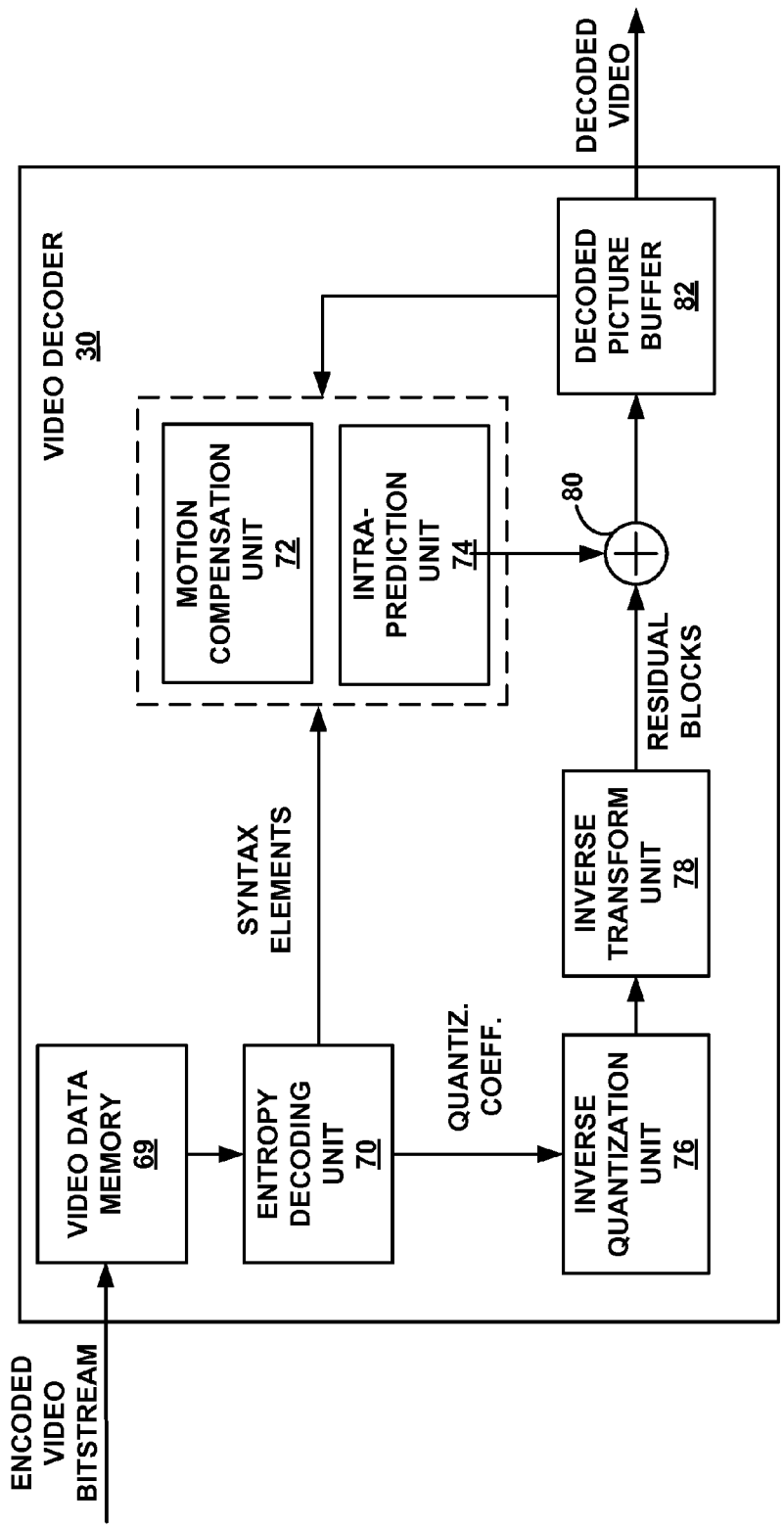
FIG. 3 is a block diagram illustrating an example of a video decoder that may perform techniques for adaptive inter-color component residual prediction in accordance with one or more aspects of this disclosure.

FIG. 3 is a block diagram illustrating an example of a video decoder that may perform techniques for adaptive inter-color component residual prediction in accordance with one or more aspects of this disclosure. In the example of FIG. 3, video decoder 30 includes a video data memory 69, an entropy decoding unit 70, motion compensation unit 72, intra-prediction unit 74, inverse quantization unit 76, inverse transformation unit 78, decoded picture buffer 82 and summer 80. In some examples, video decoder 30 may perform a decoding pass generally reciprocal to the encoding pass described with respect to video encoder 20 (FIG. 2).

Video data memory 69 may store video data, such as an encoded video bitstream, to be decoded by the components of video decoder 30. The video data stored in video data memory 69 may be obtained, for example, from computer-readable medium 16, e.g., from a local video source, such as a camera, via wired or wireless network communication of video data, or by accessing physical data storage media. Video data memory 69 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 69 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and decoded picture buffer 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements and/or syntax data from video encoder 20. Entropy decoding unit 70 of video decoder 30 entropy decodes the bitstream to generate quantized coefficients, motion vectors or intra-prediction mode indicators, and other syntax elements. Entropy decoding unit 70 may forward the motion vectors to and other syntax elements to motion compensation unit 72.

Entropy decoding unit 70 may receive syntax data for a CU, which may include one or more scale factor alpha values for use in inter-color component residual prediction as described in this disclosure. Video decoder 30 may be configured to decode a scale factor in some examples. In some examples, decoding unit may be configured to decode a shifting value, N, as described above.

In some examples, entropy decoding unit 70 may be configured to decode a LUT that contains at least one entry. Each entry may map a scale factor to an adjusted scale factor. Entropy decoding unit 70 may also be configured to decode a value that indicates a difference in a bit-depth of chroma residual samples and a bit-depth of luma residual samples.

In addition to receiving the scale factor alpha value and shifting value, entropy decoding unit 70 may decode and parse additional syntax elements in various parameter sets. Such parameter sets may include a PPS, which may include syntax elements that are common to one or more pictures, an SPS, which may include syntax elements that are common to one or more sequences of pictures.

Video decoder 30 may construct reference picture lists, List 0 and List 1, (e.g., using default construction techniques) based on reference pictures stored in decoded picture buffer 82. When the video slice is coded as an intra-coded (I) slice, intra-prediction unit 74 may generate prediction data for a video block of a current video slice. Intra-prediction unit 74 may generate the prediction data based on a signaled intra prediction mode and data from previously decoded blocks of the current frame or picture. When video decoder 30 codes slices of the video frame as an inter-coded (i.e., B, P or GPB) slice, motion compensation unit 72 may produce predictive blocks for a video block of the current video slice based on the motion vectors and other syntax elements received from entropy decoding unit 70. Motion compensation unit 72 may produce the predictive blocks from one of the reference pictures within one of the reference picture lists.

Motion compensation unit 72 may use motion vectors and/or syntax elements to determine prediction information for a video block of the current video slice. In some examples, motion compensation unit 72 may generate prediction information based on motion vectors received from entropy decoding unit 70. Motion compensation unit 72 may use the prediction information to produce the predictive blocks for the current video block being decoded. For example, motion compensation unit 72 uses some of the received syntax elements to determine a prediction mode (e.g., intra- or inter-prediction) used to code the video blocks of the current video slice, an inter-prediction slice type (e.g., B slice or P slice slice), construction information for one or more of the reference picture lists for the slice, motion vectors for each inter-encoded video block of the current video slice, inter-prediction status for each inter-coded video block of the slice, and other information to decode the video blocks in the current video slice.

When a motion vector of a PU has sub-pixel accuracy, motion compensation unit 72 may apply one or more interpolation filters to samples of a reference picture to generate a predictive block for the PU. In other words, motion compensation unit 72 may also perform interpolation based on interpolation filters. Motion compensation unit 72 may calculate interpolated values for sub-integer pixels of reference blocks using the same interpolation filters video encoder 20 used during encoding of the video blocks. Thus, in some examples, motion compensation unit 72 may determine the interpolation filters used by video encoder 20 from the received syntax elements and may use the interpolation filters to produce predictive blocks.

Inverse quantization unit 76 inverse quantizes, i.e., de-quantizes, the quantized transform coefficients provided in the bitstream and decoded by entropy decoding unit 70. Inverse quantization unit 76 may also inversely quantize one or more parameters related to adaptive inter-color component residual prediction. The parameters may include the scale factor ($\alpha$), and/or a shifting scale factor, N, in some examples. The inverse quantization process may include use of a quantization parameter $QP_Y$ to determine a degree of quantization and, likewise, a degree of inverse quantization that should be applied. Video decoder 30 may calculate the quantization parameter $QP_Y$ for each video block in the video slice.

Inverse transform unit 78 may receive dequantized transform coefficient blocks. If transform is skipped for the current block, inverse transform unit 78 may receive dequantized residual blocks. Inverse transform unit 78 may transform the received blocks using an inverse transform. In some examples, the inverse transform (e.g., an inverse DCT, an inverse integer transform, or a conceptually similar inverse transform process) to the transform coefficients in order to produce residual blocks (e.g., transform blocks) in the pixel domain. Inverse transform unit 78 may output a signal, referred to as a "reconstructed residual signal."

Video decoder 30 may also determine that the current block is intra-predicted based on syntax elements or other information. If the current video block is intra-predicted, intra-prediction unit 74 may decode the current block. Intra-prediction unit 74 may determine a neighboring predictive block from the same picture as the current block. Intra-prediction unit 74 may generate a transform coefficient block and/or a residual block based on the predictive block.

After motion compensation unit 72 or intra-prediction unit 74 generates a transform coefficient block and/or residual block for a current video block based on the motion vectors and other syntax elements, video decoder 30 forms a decoded video block by combining the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. Decoded picture buffer 82 stores the decoded video blocks in a given frame or picture, which video decoder 30 may use for subsequent motion compensation. Decoded picture buffer 82 may also store decoded video for later presentation on a display device, such as display device 32 of FIG. 1.

Motion compensation unit 72 and/or intra-prediction unit 74 may determine the block of chroma residual samples based on the luma residual block, a scale factor, and predicted chroma residual samples. Motion compensation unit 72 and/or intra-prediction unit 74 may adjust the luma residual samples by using at least one arithmetic shift operation in some examples to produce bit-depth adjusted luma residual samples, e.g. as described above with respect to equations (2)-(3), and (8)-(14). In some examples, motion compensation unit 72 and/or intra-prediction unit 74 may be configured to calculate a difference in a bit-depth of the luma residual samples and a bit depth of the predicted chroma residual samples.

Motion compensation unit 72 and/or intra-prediction unit 74 may scale the bit-depth adjusted luma residual samples to produce scaled luma residual samples based on a scale factor, $\alpha$. Motion compensation unit 72 and/or intra-prediction unit 74 may determine predicted chroma residual samples based on the chroma residual samples and the scaled luma residual samples as described in equation (7), as one example.

In some examples, motion compensation unit 72 and/or intra-prediction unit 74 may determine bit-depth adjusted luma residual signals based on a LUT, also referred to as a map. Motion compensation unit 72 and/or intra-prediction unit 74 may pre-define or generate the LUT in some examples.

Once video decoder 30 generates reconstructed video, video decoder 30 may output the reconstructed video blocks as decoded video (e.g., for display or storage) in some examples. In this manner, video decoder 30 represents an example of a video decoder configured to determine luma residual samples for a block of video data, and determine chroma residual samples for the block of video data.

As described above, during inter-prediction, motion compensation unit 72 may determine one or more reference pictures that video decoder 30 may use to form the predictive video blocks for the current block being decoded. Motion compensation unit 72 may determine whether reference pictures are long term reference pictures or short-term reference pictures based on syntax elements of the coded video bitstream, which indicate whether a reference picture is marked for long term reference or short-term reference. Motion compensation unit 72 may store the reference pictures in decoded picture buffer 82 until the reference pictures are marked as unused for reference.

In accordance with the techniques of this disclosure, video decoder 30 represents an example of a video decoder configured to determine a first bit-depth of luma residual samples for a block of video data, and determine a second bit-depth of predicted chroma residual samples for the block of video data. Video decoder 30 may be further configured to adjust the luma residual samples based on the first bit-depth and the second bit-depth to produce bit-depth adjusted luma residual samples, determine chroma residual samples for the block of video data based on the bit-depth adjusted luma residual samples and the predicted chroma residual samples, and decode the block of video data based on the luma residual samples and the chroma residual samples.

Figure 4:
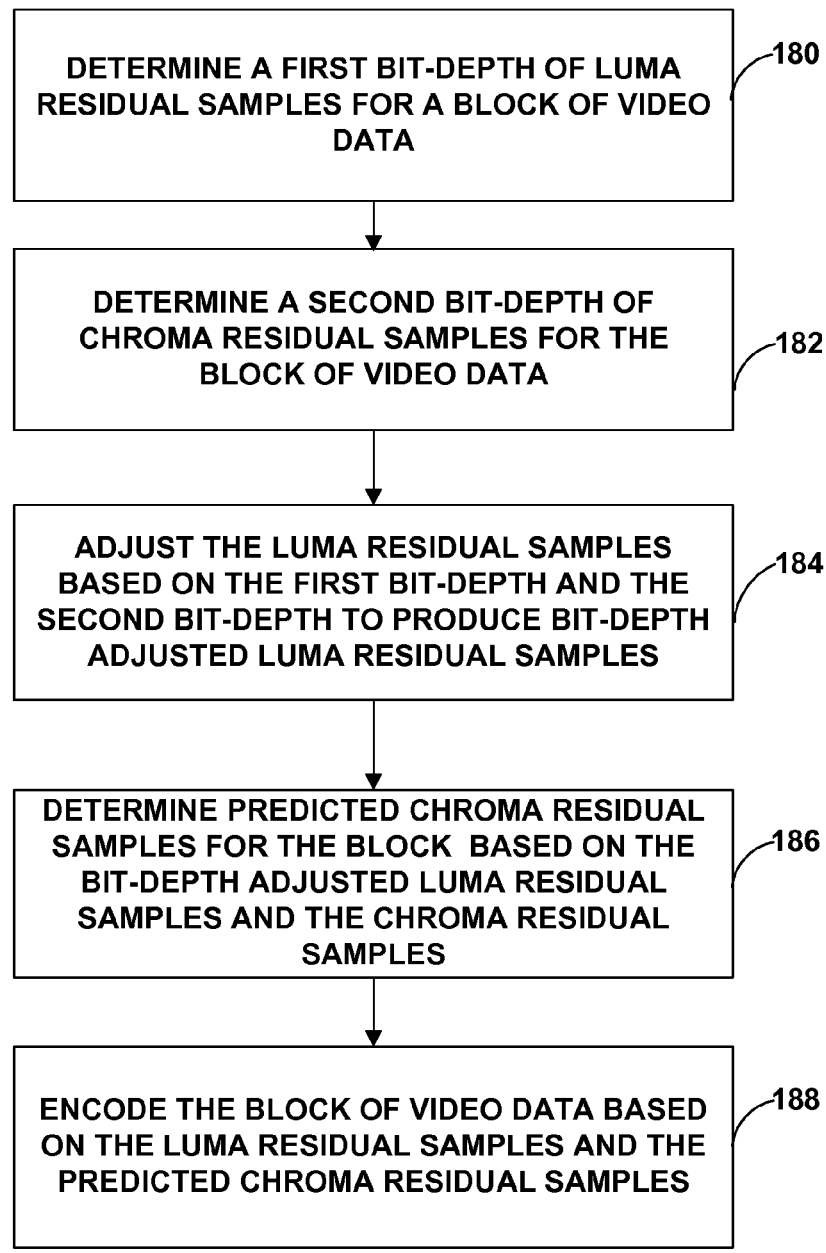
FIG. 4 is a flowchart illustrating an example of a process for performing adaptive inter-color component residual prediction in accordance with one or more aspects of this disclosure.

FIG. 4 is a flowchart illustrating an example of process for performing adaptive inter-color component residual prediction in accordance with one or more aspects of this disclosure. For purposes of illustration only, the method of FIG. 4 may be performed by a video encoder, such as a video encoder corresponding to video encoder 20 of FIGS. 1 and 2.

In the method of FIG. 4, motion compensation unit 44 of video encoder 20 may determine a first bit-depth of luma residual samples for a block of video data (180), and determine a second bit-depth of chroma residual samples for the block of video data (182). Motion compensation unit 44 and/or intra-prediction unit 46 may adjust the luma residual samples based on the first bit-depth and the second bit-depth to produce bit-depth adjusted luma residual samples (184), and determine predicted chroma residual samples for the block of video data based on the bit-depth adjusted luma residual samples and the chroma residual samples (186). Quantization unit 54 and entropy encoding unit 56 may be further configured to encode the block of video data based on the luma residual samples and the predicted chroma residual samples (188).

Figure 5:
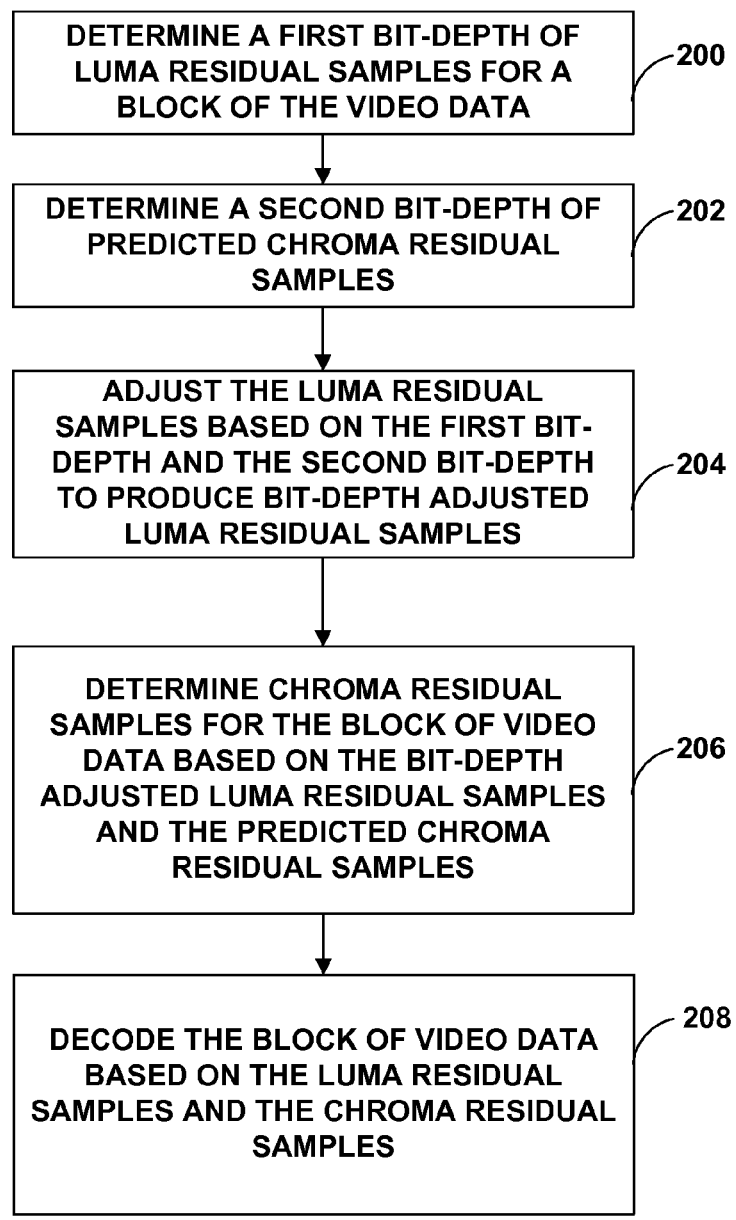
FIG. 5 is a flowchart illustrating another example of a process for performing adaptive inter-color component residual prediction in accordance with one or more aspects of this disclosure.

FIG. 5 is a flowchart illustrating another example of a process for performing adaptive inter-color component residual prediction in accordance with one or more aspects of this disclosure. For purposes of illustration only, the method of FIG. 5 may be performed by a video decoder, such as a video encoder corresponding to video decoder 30 of FIGS. 1 and 3.

In the method of FIG. 5, video decoder 30 may determine a first bit-depth of luma residual samples for a block of video data (200), and determine a second bit-depth of predicted chroma residual samples for the block of video data (202). Motion compensation unit 72 and/or intra-prediction unit 74 of video decoder 30 may be further configured to adjust the luma residual samples based on the first bit-depth and the second bit-depth to produce bit-depth adjusted luma residual samples (204), and determine chroma residual samples for the block of video data based on the bit-depth adjusted luma residual samples and the predicted chroma residual samples (206). Motion compensation unit 72 and/or intra-prediction unit 74 of video decoder 30 may decode the block of video data based on the luma residual samples and the chroma residual samples (208).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any con is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a first bit-depth of luma residual samples for a block of video data;
   determining a second bit-depth of predicted chroma residual samples for the block of video data;
   determining a bit-depth difference between the first bit-depth of the luma residual samples and the second bit-depth of the predicted chroma residual samples;
   adjusting the luma residual samples based on the bit-depth difference to produce bit-depth adjusted luma residual samples having a bit-depth that matches the second bit-depth of the predicted chroma residual samples;
   determining chroma residual samples for the block of video data based on the bit-depth adjusted luma residual samples and the predicted chroma residual samples; and
   decoding the block of video data based on the luma residual samples and the chroma residual samples.

2. The method of claim 1, wherein adjusting the luma residual samples comprises performing at least one shift operation on the luma residual samples based on the bit-depth difference.

3. The method of claim 2, wherein performing the at least one shift operation on the luma residual samples comprises arithmetically shifting the luma residual samples based on the bit-depth difference.

4. The method of claim 1, wherein determining the bit-depth difference comprises decoding the bit-depth difference.

5. The method of claim 1, wherein, based on the first bit-depth being greater than the second bit-depth and the bit-depth difference being greater than zero, adjusting the luma residual samples comprises right-shifting the luma residual samples by the bit-depth difference.

6. The method of claim 1, wherein, based on the first bit-depth being less than the second bit-depth and the bit-depth difference being less than zero, adjusting the luma residual samples comprises left-shifting the luma residual samples by the bit-depth difference.

7. The method of claim 1, wherein adjusting the luma residual samples to produce the bit-depth adjusted luma residual samples comprises:
   clipping the bit-depth adjusted luma residual samples to be within a range, wherein a maximum value of the range is based on a positive value of a variable, and wherein a minimum value of the range is based on a negative value of the variable.

8. The method of claim 1, wherein determining the chroma residual samples comprises:
   adding the predicted chroma residual samples to the bit-depth adjusted luma residual samples to determine the chroma residual samples.

9. The method of claim 1, wherein determining the chroma residual samples comprises:
   multiplying the bit-depth adjusted luma residual samples by a scale factor to determine scaled luma residual samples; and
   adding the predicted chroma residual samples to the scaled luma residual samples to determine the chroma residual samples.

10. The method of claim 9, further comprising decoding the scale factor.

11. A method of encoding video data, the method comprising:
    determining a first bit-depth of luma residual samples for a block of video data;
    determining a second bit-depth of chroma residual samples for the block of video data;
    determining a bit-depth difference between the first bit-depth of the luma residual samples and the second bit-depth of the chroma residual samples;
    adjusting the luma residual samples based on the bit-depth difference to produce bit-depth adjusted luma residual samples having a bit-depth that matches the second bit-depth of the chroma residual samples;
    determining predicted chroma residual samples for the block of video data based on the bit-depth adjusted luma residual samples and the chroma residual samples; and
    encoding the block of video data based on the luma residual samples and the predicted chroma residual samples.

12. The method of claim 11, wherein adjusting the luma residual samples comprises performing at least one shift operation on the luma residual samples based on the bit-depth difference.

13. The method of claim 12, wherein performing the at least one shift operation on the luma residual samples comprises arithmetically shifting the luma residual samples based on the bit-depth difference.

14. The method of claim 11, further comprising encoding the bit-depth difference.

15. The method of claim 11, wherein, based on the first bit-depth being greater than the second bit-depth and the bit-depth difference being greater than zero, adjusting the luma residual samples comprises right-shifting the luma residual samples by the bit-depth difference.

16. The method of claim 11, wherein, based on the first bit-depth being less than the second bit-depth and the bit-depth difference being less than zero, adjusting the luma residual samples comprises left-shifting the luma residual samples by the bit-depth difference.

17. The method of claim 11, wherein adjusting the luma residual samples to produce the bit-depth adjusted luma residual samples comprises:
  clipping the scaled luma residual samples to be within a range, wherein a maximum value of the range is based on a positive value of a variable, and wherein a minimum value of the range is based on a negative value of the variable.

18. The method of claim 11, wherein determining the predicted chroma residual samples comprises:
  subtracting the chroma residual samples from the bit-depth adjusted luma residual samples to determine the predicted chroma residual samples.

19. The method of claim 11, wherein determining the predicted chroma residual samples further comprises:
  multiplying the bit-depth adjusted luma residual samples by a scale factor to produce scaled luma residual samples; and
  subtracting the chroma residual samples from the bit-depth adjusted luma residual samples to determine the predicted chroma residual samples.

20. The method of claim 19, further comprising encoding the scale factor.

21. A device for decoding video data, the device comprising:
  a memory configured to store video data; and
  at least one processor in communication with the memory, the at least one processor being configured to:
    determine a first bit-depth of luma residual samples for a block of video data stored in the memory;
    determine a second bit-depth of predicted chroma residual samples for the block of video data stored in the memory;
    determine a bit-depth difference between the first bit-depth of the luma residual samples and the second bit-depth of the predicted chroma residual samples;
    adjust the luma residual samples based on the bit-depth difference to produce bit-depth adjusted luma residual samples having a bit-depth that matches the second bit-depth of the predicted chroma residual samples;
    determine chroma residual samples for the block of video data based on the bit-depth adjusted luma residual samples and the predicted chroma residual samples; and
    decode the block of video data based on the luma residual samples and the chroma residual samples.

22. The device of claim 21, wherein to adjust the luma residual samples, the at least one processor is configured to perform at least one shift operation on the luma residual samples based on the bit-depth difference.

23. The device of claim 22, wherein to perform the at least one shift operation on the luma residual samples, the at least one processor is further configured to arithmetically shift the luma residual samples based on the bit-depth difference.

24. The device of claim 21, wherein to determine the bit-depth difference, the at least one processor is configured to decode the bit-depth difference.

25. The device of claim 21, wherein, based on the first bit-depth being greater than the second bit-depth and the bit-depth difference being greater than zero, to adjust the luma residual samples, the at least one processor is configured to right-shift the luma residual samples by the bit-depth difference.

26. The device of claim 21, wherein, based on the first bit-depth being less than the second bit-depth and the bit-depth difference being less than zero, to adjust the luma residual samples, the at least one processor is configured to left-shift the luma residual samples by the bit-depth difference.

27. The device of claim 21, wherein to adjust the luma residual samples to produce the bit-depth adjusted luma residual samples, the at least one processor is configured to:
  clip the bit-depth adjusted luma residual samples to be within a range, wherein a maximum value of the range is based on a positive value of a variable, and wherein a minimum value of the range is based on a negative value of the variable.

28. The device of claim 21, wherein to determine the chroma residual samples, the at least one processor is configured to:
  add the predicted chroma residual samples to the bit-depth adjusted luma residual samples to determine the chroma residual samples.

29. The device of claim 21, wherein to determine the chroma residual samples, the at least one processor is further configured to:
  multiply the bit-depth adjusted luma residual samples by a scale factor to determine scaled luma residual samples; and
  add the predicted chroma residual samples to the scaled luma residual samples to determine the chroma residual samples.

30. The device of claim 29, wherein the at least one processor is further configured to decode the scale factor.

31. A device for encoding video, the device comprising:
  a memory configured to store video data; and
  at least one processor in communication with the memory, the at least one processor being configured to:
    determine a first bit-depth of luma residual samples for a block of video data stored in the memory;
    determine a second bit-depth of chroma residual samples for the block of video data stored in the memory;
    determine a bit-depth difference between the first bit-depth of the luma residual samples and the second bit-depth of the chroma residual samples;
    adjust the luma residual samples based on the bit-depth difference to produce bit-depth adjusted luma residual samples having a bit-depth that matches the second bit-depth of the chroma residual samples;
    determine predicted chroma residual samples for the block of video data based on the bit-depth adjusted luma residual samples and the chroma residual samples; and
    encode the block of video data based on the luma residual samples and the predicted chroma residual samples.

32. The device of claim 31, wherein to adjust the luma residual samples, the at least one processor is configured to performing at least one shift operation on the luma residual samples based on bit-depth difference.

33. The device of claim 32, wherein to perform the at least one shift operation on the luma residual samples, the at least one processor is further configured to arithmetically shift the luma residual samples based on the bit-depth difference.

34. The device of claim 31, wherein the at least one processor is further configured to encode the bit-depth difference.

35. The device of claim 31, wherein, based on the first bit-depth being greater than the second bit-depth and the bit-depth difference being greater than zero, to adjust the luma residual samples, the at least one processor is configured to right-shift the luma residual samples by the bit-depth difference.

36. The device of claim 31, wherein, based on the first bit-depth being less than the second bit-depth and the bit-depth difference being less than zero, to adjust the luma residual samples, the at least one processor is configured to left-shift the luma residual samples by the bit-depth difference.

37. The device of claim 31, wherein to adjust the luma residual samples to produce the bit-depth adjusted luma residual samples, the at least one processor is configured to:
    clip the scaled luma residual samples to be within a range, wherein a maximum value of the range is based on a positive value of a variable, and wherein a minimum value of the range is based on a negative value of the variable.

38. The device of claim 31, wherein to determine the predicted chroma residual samples, the at least one processor is configured to:
    subtract the chroma residual samples from the bit-depth adjusted luma residual samples to determine the predicted chroma residual samples.

39. The device of claim 31, wherein to determine the predicted chroma residual samples, the at least one processor is further configured to:
    multiply the bit-depth adjusted luma residual samples by a scale factor to produce scaled luma residual samples; and
    subtract the chroma residual samples from the bit-depth adjusted luma residual samples to determine the predicted chroma residual samples.

40. The method of claim 39, wherein the at least one processor is further configured to encode the scale factor.

41. A device for decoding video data, the device comprising:
    means for determining a first bit-depth of luma residual samples for a block of video data;
    means for determining a second bit-depth of predicted chroma residual samples for the block of video data;
    means for determining a bit-depth difference between the first bit-depth of the luma residual samples and the second bit-depth of the predicted chroma residual samples;
    means for adjusting the luma residual samples based on the bit-depth difference to produce bit-depth adjusted luma residual samples having a bit-depth that matches the second bit-depth of the predicted chroma residual samples;
    means for determining chroma residual samples for the block of video data based on the bit-depth adjusted luma residual samples and the predicted chroma residual samples; and
    means for decoding the block of video data based on the luma residual samples and the chroma residual samples.

42. The method of claim 41, wherein the means for adjusting the luma residual samples comprises means for performing at least one shift operation on the luma residual samples based on the bit depth difference.

43. The device of claim 41, wherein, based on the first bit-depth being greater than the second bit-depth and the bit-depth difference being greater than zero, the means for adjusting the luma residual samples comprises means for right-shifting the luma residual samples by the bit-depth difference.

44. The device of claim 41, wherein, based on the first bit-depth being less than the second bit-depth and the bit-depth difference being less than zero, the means for adjusting the luma residual samples comprises means for left-shifting the luma residual samples by the bit-depth difference.

45. The device of claim 41, wherein the means for determining the chroma residual samples comprises:
    means for adding the predicted chroma residual samples to the luma residual samples to the bit-depth adjusted luma residual samples to determine the chroma residual samples.

46. The device of claim 41, wherein the means for determining the chroma residual samples further comprises:
    means for multiplying the bit-depth adjusted luma residual samples by a scale factor to determine scaled luma residual samples; and
    means for adding the predicted chroma residual samples to the scaled luma residual samples to determine the chroma residual samples.

47. A non-transitory computer-readable storage medium having instructions stored thereon that, when executed, cause at least one processor to:
    determine a first bit-depth of luma residual samples for a block of video data;
    determine a second bit-depth of predicted chroma residual samples for the block of video data;
    determine a bit-depth difference between the first bit-depth of the luma residual samples and the second bit-depth of the predicted chroma residual samples;
    adjust the luma residual samples based on the bit-depth difference to produce bit-depth adjusted luma residual samples having a bit-depth that matches the second bit-depth of the predicted chroma residual samples;
    determine chroma residual samples for the block of video data based on the bit-depth adjusted luma residual samples and the predicted chroma residual samples; and
    decode the block of video data based on the luma residual samples and the chroma residual samples.

48. The non-transitory computer-readable storage medium of claim 47, wherein the instructions that, when executed, cause the at least one processor to adjust the luma residual samples cause the at least one processor to perform at least one shift operation on the luma residual samples based on the bit-depth difference.

49. The non-transitory computer-readable storage medium of claim 47, wherein, based on the first bit-depth being greater than the second bit-depth and the bit-depth difference being greater than zero, the instructions that, when executed, cause the at least one processor to adjust the luma residual samples further cause the at least one processor to right-shift the luma residual samples by the bit-depth difference.

50. The non-transitory computer-readable storage medium of claim 47, wherein, based on the first bit-depth being less than the second bit-depth and the bit-depth difference being less than zero, the instructions that, when executed, cause the at least one processor to adjust the luma residual samples further cause the at least one processor to left-shift the luma residual samples by the bit-depth difference.

51. The non-transitory computer-readable storage medium of claim 47, wherein the instructions that, when executed, cause the at least one processor to determine the chroma residual samples further cause the at least one processor to:

add the predicted chroma residual samples to the luma residual samples to the bit-depth adjusted luma residual samples to determine the chroma residual samples.

52. The non-transitory computer-readable storage medium of claim 47, wherein the instructions that, when executed, cause the at least one processor to determine the chroma residual samples further cause the at least one processor to:
- multiply the bit-depth adjusted luma residual samples by a scale factor to determine scaled luma residual samples; and
- add the predicted chroma residual samples to the scaled luma residual samples to determine the chroma residual samples.

* * * * *